(12) United States Patent
Zimmer et al.

(10) Patent No.: US 9,920,723 B2
(45) Date of Patent: Mar. 20, 2018

(54) MULTILAYERED MOTOR VEHICLE PIPELINE

(71) Applicant: TI Automotive (Fuldabrück) GmbH, Fuldabrück (DE)

(72) Inventors: Werner Zimmer, Melsungen Röhrenfurth (DE); Frank Fahrenholz, Kassel (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 0 days.

(21) Appl. No.: 15/071,983

(22) Filed: Mar. 16, 2016

(65) Prior Publication Data
US 2016/0273499 A1 Sep. 22, 2016

(30) Foreign Application Priority Data

Mar. 17, 2015 (EP) .................... 15159473

(51) Int. Cl.
| | | |
|---|---|---|
| *F02M 37/00* | (2006.01) | |
| *B32B 7/04* | (2006.01) | |
| *B32B 7/08* | (2006.01) | |
| *B32B 7/12* | (2006.01) | |
| *B32B 27/08* | (2006.01) | |
| *B32B 27/30* | (2006.01) | |
| *B32B 27/34* | (2006.01) | |
| *B32B 1/08* | (2006.01) | |

(Continued)

(52) U.S. Cl.
CPC ....... *F02M 37/0017* (2013.01); *B29C 47/065* (2013.01); *B32B 1/08* (2013.01); *B32B 3/02* (2013.01); *B32B 3/26* (2013.01); *B32B 3/263* (2013.01); *B32B 3/28* (2013.01); *B32B 3/30* (2013.01); *B32B 7/04* (2013.01); *B32B 7/08* (2013.01); *B32B 7/12* (2013.01); *B32B 27/08* (2013.01); *B32B 27/306* (2013.01); *B32B 27/34* (2013.01); *F16L 9/121* (2013.01); *F16L 9/123* (2013.01); *F16L 9/133* (2013.01); *B29C 47/0023* (2013.01); *B29C 47/26* (2013.01); *B32B 2307/724* (2013.01); *B32B 2307/7242* (2013.01); *B32B 2307/7244* (2013.01); *B32B 2307/7265* (2013.01); *B32B 2597/00* (2013.01); *B32B 2605/08* (2013.01); *F16L 2011/047* (2013.01)

(58) Field of Classification Search
CPC ................................. B32B 3/30; B29C 47/067
USPC .......................................... 138/140, 141, 137
See application file for complete search history.

(56) References Cited

U.S. PATENT DOCUMENTS 5,566,720 A * 10/1996 Cheney ..................... F16L 9/12
138/137
6,644,388 B1 * 11/2003 Kilmer ...................... F28F 1/10
165/109.1

(Continued)

OTHER PUBLICATIONS

EP Search Report dated Aug. 24, 2015 for EP15159473.6.

*Primary Examiner* — Craig Schneider
*Assistant Examiner* — David Deal
(74) *Attorney, Agent, or Firm* — Brinks Gilson & Lione (57) ABSTRACT

A multilayered motor vehicle pipeline, wherein the pipeline has at least two layers, preferably at least three layers of plastic. At least one surface of at least one layer connected to another layer is configured profiled, wherein the profiling has maxima and minima. The height difference $\Delta h$ between the maxima and the minima directly adjacent to the maxima is between 1 and 100 μm.

21 Claims, 4 Drawing Sheets

(51) Int. Cl.
*B32B 3/02* (2006.01)
*B32B 3/26* (2006.01)
*B32B 3/28* (2006.01)
*B32B 3/30* (2006.01)
*F16L 9/12* (2006.01)
*F16L 9/133* (2006.01)
*B29C 47/06* (2006.01)
*B29C 47/00* (2006.01)
*B29C 47/26* (2006.01)
*F16L 11/04* (2006.01)

(56) References Cited

U.S. PATENT DOCUMENTS

2005/0276985 A1 12/2005 Mugglie et al.
2012/0216903 A1* 8/2012 Osborne ................ B65H 69/08
138/137

* cited by examiner

MULTILAYERED MOTOR VEHICLE PIPELINE

RELATED APPLICATIONS

The present patent document claims the benefit of and priority to European Patent Application No. EP 15159473.6 filed Mar. 17, 2015, the entire contents of which are incorporated herein by reference.

FIELD

The present disclosure relates to a multilayered motor vehicle pipeline, in particular a multilayered fuel pipeline for motor vehicles, wherein the pipeline has at least two layers of plastic, preferably at least three layers of plastic. The layers are made in particular from thermoplastic material.

BACKGROUND

Many different embodiments of multilayered motor vehicle pipelines or fuel pipelines of the aforementioned kind are known from the practice. One problem is frequently the adhesion between the individual layers in the layered laminate. Many known multilayered pipelines of this kind display undesirable delamination characteristics after long periods of operation, which can in the end render the motor vehicle pipelines unusable. It can lead to leakage and vehicle breakdown. The delamination is even further intensified or accelerated, as a rule, as a result of external chemical, thermal and mechanical influences. These delamination problems apply basically more or less to all layers in a layered laminate of the pipeline. Particularly frequently affected are however the adhesive layers arranged in the laminate composite or the layers connected therewith. Corresponding problems result frequently also for barrier layers or permeation and/or diffusion barrier layers, for example, barrier layers of ethylene vinyl alcohol copolymer (EVOH), which are provided in the layered composite. The multilayered motor vehicle pipelines known from the practice are in need of improvement in this respect.

SUMMARY

The present disclosure provides a multilayered motor vehicle pipeline of the initially mentioned kind, in which the aforementioned disadvantages can be prevented or minimized and in which a multilayered composite that is particularly stable with regard to delamination can be achieved. The multilayered fuel pipeline has at least two layers of plastic, and preferably at least three layers of plastic, wherein at least one layer is configured profiled with one surface that is connected to a further layer, wherein the pattern has maxima and minima, and wherein the height difference $\Delta h$ between the maxima and the minima adjacent or directly adjacent to the maxima is between 1 and 100 μm, preferably between 1 and 50 μm, preferably between 1 and 25 μm, or preferably between 1 and 20 μm. Included within the scope of the present disclosure is that the at least two layers, preferably at least three layers of the pipeline, are made from plastic, or are made fundamentally from thermoplastic material. It is furthermore within the scope of the present disclosure that the at least one layer profiled according to the present disclosure is configured as profiled at its two mutually opposite surfaces according to the present disclosure, wherein preferably each profiling of the two surfaces has the aforementioned specified maxima and minima.

It is recommended that the at least one layer profiled according to the present disclosure, or the at least one surface profiled according to the present disclosure of this layer runs over at least 80%, preferably over at least 90%, and preferably over at least 95% of the circumference of the pipeline. The at least one layer profiled according to the present disclosure or the at least one surface profiled according to the present disclosure of this layer preferably runs around over the entire circumference of the pipeline. The maxima and minima of the profiling are suitably arranged evenly or fundamentally evenly over the circumference of the pipeline.

It is within the scope of the present disclosure that the surface of a further layer, or a second layer connected to a surface of a first layer profiled according to the present disclosure, is likewise configured as profiled according to the present disclosure, wherein this profiling of the further layer or the second layer is preferably configured similar or complementary to the profiling of the first layer. The second layer thus suitably has likewise maxima and minima, and the height difference $\Delta h$ between the maxima and the minima directly adjacent to the maxima is between 1 and 100 μm, preferably between 1 and 50 μm, preferably between 1 and 25 μm, and particularly preferably between 1 and 20 μm. According to a recommended embodiment of the present disclosure, at least one layer, or at least the first layer, is configured profiled according to the present disclosure at both its surfaces and a surface profiled according to the present disclosure of another layer is attached to at least one and preferably to each of these surfaces profiled according to the present disclosure. The two profilings of a surface profiled according to the present disclosure of the one or the first layer are preferably configured complementary to the profilings of a surface profiled according to the present disclosure of another or second layer, which is attached thereto.

It is within the scope of the present disclosure that the maxima of the surface profiled, according to the present disclosure, of a first layer engage in a form-fitting—and preferably force-fitting—manner in the minima of the surface profiled according to the present disclosure of another layer or second layer attached thereto, and that the maxima of the surface profiled according to the present disclosure of the further or second layer inversely suitably engages in a form-fitting—and, as recommended, force-fitting—manner in the minima of the surface profiled, according to the present disclosure of the first layer. The height difference $\Delta h$ between the maxima and the directly adjacent minima in the first layer and in the further or second layer is equal or fundamentally equal. It is furthermore within the scope of the present disclosure that the maxima and minima of the first layer and the maxima and minima of the further or second layer attached thereto have the same shape or have fundamentally the same shape.

One embodiment of the present disclosure is characterized in that the distances a between the maxima and the minima directly adjacent to the maxima of a surface profiled according to the present disclosure amount to 1 to 100 μm, preferably 1 to 50 μm, preferably 1 to 25 μm, and particularly preferably 2 to 20 μm. It is thereby within the scope of the present disclosure that the distances a are measured in circumferential direction of the pipeline.

According to another embodiment of the present disclosure, the at least one layer provided with at least one surface profiled according to the present disclosure is a central layer of the pipeline, which is respectively connected via its two surfaces to another layer of the pipeline. According to one embodiment, two surfaces of the central layer are thereby configured as surfaces profiled according to the present disclosure. A surface of another layer, which is connected to a surface profiled according to the present disclosure of the central layer, is suitably configured, as profiled, surface connected to the central layer, and in particular as surface profiled according to the present disclosure. The central layer is an adhesive layer between two layers of the pipeline laminate according to a particularly preferred embodiment of the present disclosure. However, it can also be a barrier layer or a permeation and/or diffusion barrier layer.

A proven embodiment of the present disclosure is characterized in that a layer profiled according to the present disclosure is an adhesive layer, which is respectively attached with its two surfaces to another layer, wherein preferably two surfaces of the adhesive layer are configured profiled and, as recommended, profiled according to the present disclosure. Such an adhesive layer suitably has a thickness of 0.02 mm to 0.15 mm, preferably a thickness of 0.03 mm to 0.12 mm, and particularly preferably a thickness of 0.03 mm to 0.10 mm. One embodiment of the present disclosure is characterized in that at least one surface profiled according to the present disclosure of the adhesive layer is attached to a barrier layer or a permeation and/or diffusion barrier. The surface of the barrier layer attached to the adhesive layer is suitably also profiled according to the present disclosure. Another embodiment of the present disclosure is characterized in that two adhesive layers are provided in the multilayered pipeline, which are both profiled according to the present disclosure, and are both preferably profiled, and particularly preferably profiled according to the present disclosure, at their two mutually opposite surfaces. According to an embodiment, a layer or merely one layer is interposed between the two adhesive layers, wherein this interposed layer is preferably a barrier layer. At least the two surfaces of the adhesive layers connected to the barrier layer are thereby suitably profiled according to the present disclosure. The barrier layer is then profiled according to the present disclosure, as recommended, at its two mutually opposite surfaces. Both adhesive layers preferably have the thicknesses disclosed above for the adhesive layer. The surfaces facing away from the barrier layer or the surfaces profiled according of the present disclosure of the two adhesive layers are suitably attached to further layers of the multilayered pipeline. At least one of the layers attached outside directly to the adhesion layers is thereby made from polyamide or is made fundamentally from polyamide according to the present disclosure. The two directly attached layers are preferably made from polyamide or are made fundamentally from polyamide. It is understood that an adhesive layer ensures or secures the adhesion between the two layers that are attached at their surfaces. The adhesive layer or layers can be, for example, an adhesive layer or layers based on polyamide. The barrier layer is made from ethylene vinyl alcohol copolymer (EVOH) or is made fundamentally from ethylene vinyl alcohol copolymer (EVOH) according to an embodiment of the present disclosure. The thickness of the barrier layer suitably is 0.05 to 0.3 mm, preferably 0.10 to 0.25 mm, and particularly preferably 0.11 to 0.20 mm, for example, 0.15 mm. If at least one, preferably at least two adhesive layers, which are profiled according to the present disclosure on at least one, preferably on two of their surfaces, or are profiled according to the present disclosure on both surfaces, are provided in the laminate composite according to the preferred embodiment of the present disclosure, it is within the scope of the present disclosure that also the layers respectively attached to their surfaces profiled according to the present disclosure or their attached surfaces are profiled according to the present disclosure. Profiled according to the present disclosure means in particular that the above-specified height difference $\Delta h$ and preferably the above-specified distances a are provided. It is furthermore within the scope of the present disclosure that the above-disclosed layer thicknesses of the layers are merely measured from the minima of the layers in the presence of surfaces profiled according to the present disclosure.

Another embodiment variant of the present disclosure is characterized in that a layer provided with a surface profiled according to the present disclosure is the internal layer of the pipeline, which is attached to another layer with its external surface profiled according to the present disclosure. It is within the scope of the present disclosure that this inner layer comes in contact with its internal surface with the fluid medium flowing through the pipeline. The inner surface of the inner layer of the pipeline is suitably configured unprofiled or fundamentally unprofiled. Moreover, according to the preferred embodiment of the present disclosure, the outer surface of the outer layer of the pipeline is configured as unprofiled or fundamentally unprofiled.

According another embodiment of the present disclosure, the multilayered motor vehicle pipeline or fuel pipeline according to the present disclosure is produced by means of coextrusion. It is thus within the scope of the present disclosure that the layers, or all layers of the multilayered pipeline, are made from plastic or from thermoplastic material. At least the layer with at least one surface profiled according to the present disclosure, and the at least one layer attached to the surface profiled according to the present disclosure, are suitably produced by means of coextrusion. It is within the scope of the present disclosure that the extruder used for coextrusion is configured with the provision that the at least one layer with the at least one surface configured profiled according to the present disclosure is produced by coextrusion. It is further within the scope of the present disclosure that the extruder used for extrusion of the pipeline according to the present disclosure has annular channels for extrusion of the individual layers of the pipeline.

At least one annular channel is provided with transversal webs running in a radial direction in order to realize the at least one surface profiled according to the present disclosure of at least one layer. The transversal webs can thereby extend over the total radial width of the annular channel. The transversal webs can however also extend only over one part of the radial width of the respective annular channel, in particular if one layer is to be produced with a surface profiled according to the present disclosure. The interruption created by the transversal webs affects the formation of the maxima and minima of the profiled surface or surfaces produced according to the present disclosure. It is therefore within the scope of the present disclosure that the respective layer of the pipeline is configured profiled according to the present disclosure at both mutually opposite surfaces.

The maxima and minima of a surface profiled according to the present disclosure suitably extend in longitudinal direction of the pipeline. It is thus recommended that the maxima and minima are configured in the form of webs and grooves running in longitudinal direction of the pipeline. It is preferred thereby—however not absolutely necessary—that the height difference $\Delta h$ between the maxima and minima in the longitudinal direction of the pipeline remains constant or remains fundamentally constant. The same applies also for the distances a between the maxima and minima. It is within the scope of the present disclosure that the at least one layer profiled according to the present disclosure or the surface profiled according to the present disclosure of this layer and the preferably at least two and especially preferably all layers profiled according to the present disclosure of the surfaces profiled according to the present disclosure of these layers extend over at least 80%, preferably over at least 90%, and particularly preferably over at least 95% of the circumference of the pipeline. According to a highly recommended embodiment, the at least one layer profiled according to the present disclosure or the surface profiled according to the present disclosure of this layer, and according to another proven embodiment variant, at least two layers profiled according to the present disclosure and preferably at least all layers profiled according to the present disclosure or their surface profiled according to the present disclosure extend over the entire circumference of the pipeline.

Another embodiment of the present disclosure is characterized in that the profiling of the at least one surface profiled according to the present disclosure is configured with an undulated cross section. In this embodiment, the wave crests correspond to the maxima and the wave troughs correspond to the minima of the profiling according to the present disclosure. The wave crests and/or the wave troughs of this profiling with undulated cross section can thereby be configured pointed or rounded.

It is within the scope of the present disclosure that the maxima and the minima or the wave crests and the wave troughs extend in a longitudinal direction of the pipeline in the form of webs and grooves. According to a recommended embodiment of the present disclosure, these webs and grooves are arranged parallel to the longitudinal axis L of the pipeline or fundamentally parallel to the longitudinal axis L of the pipeline. It is furthermore within the scope of the present disclosure that the webs of a surface profiled according to the present disclosure engage in the grooves of a surface profiled according to the present disclosure that is attached thereto, preferably in a form-fitting and preferentially in a force-fitting manner, and vice versa.

The present disclosure is based on the realization that a very effective and operatively sound adhesion between the correspondingly adjacent layers of the pipeline can be achieved based on the profiling according to the present disclosure of at least one surface of a layer of the pipeline according to the present disclosure. This applies in particular to the preferred embodiment of the present disclosure, in which both mutually connected surfaces of two adjacent layers are configured profiled and wherein the profiling of the one layer is complementary to the profiling of the other layer. It is also important that this advantage according to the present disclosure can be achieved with very simple and less expensive means. The profilings according to the present disclosure can be produced without problems with an extrusion or coextrusion with a correspondingly configured extruder. Especially the central layers in the laminate composite of a motor vehicle pipeline according to the present disclosure can be held particularly firmly adhered in the composite, and are characterized long-term as well by an excellent bond or adhesion in the case of chemical actions, as well as thermal and mechanical stress. The profiling according to the present disclosure has shown to be particularly reliable in adhesive layers. These adhesive layers consequently ensure then a particularly effective and firm bond of the layers attached thereto. Further expenditure for the improvement of the adhesion can thus be forgone and a pipeline according to the present disclosure is characterized in this respect by a low expense and low costs.

The present disclosure will be described in more detail in the following with the aid of the drawing, in which merely one exemplary embodiment is represented. In the schematic representation,

DETAILED DESCRIPTION

Figure 1:
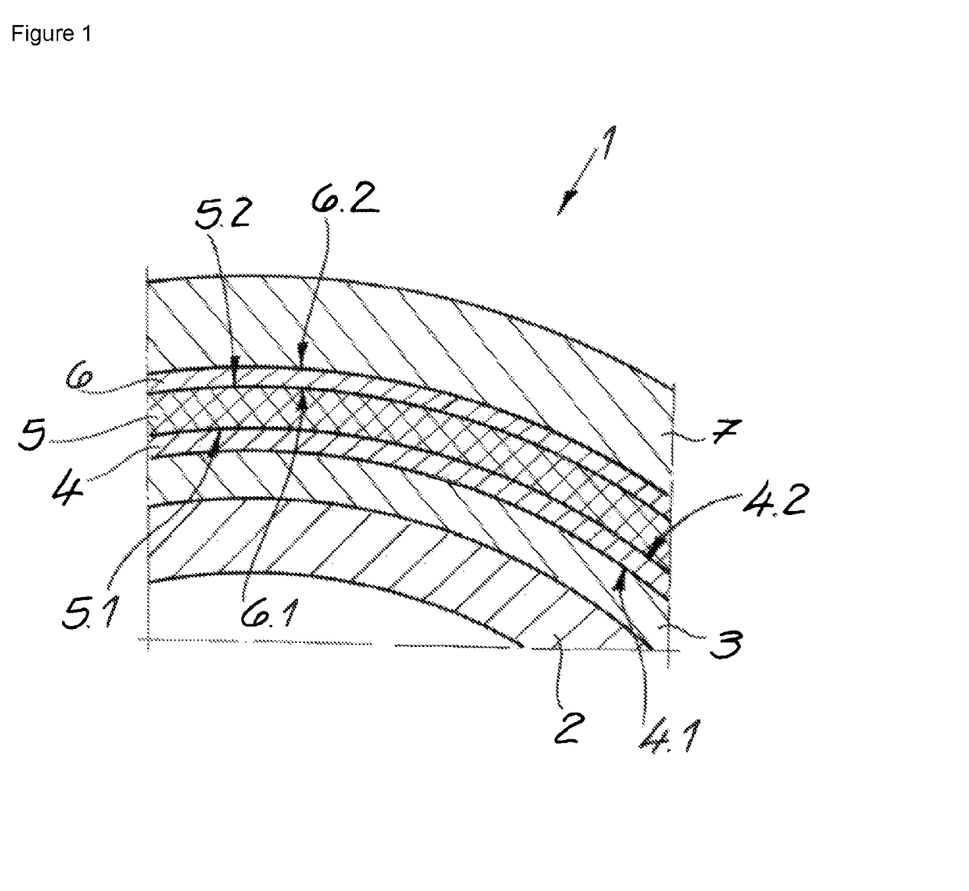
FIG. 1 shows a cross section through a multilayered or six-layer pipeline according to the prior art.

In the exemplary embodiment according to the figures, the pipeline 1 has a total of six layers 2 to 7. A central barrier layer 5 is provided, on whose surfaces 5.1 and 5.2 an adhesive layer 4 or 6 is respectively attached. To the inner adhesive layer 4 are attached two inner layers 3 and 2, and to the outer adhesive layer 6 is attached an outer layer 7. FIG. 1 shows a six-layer motor vehicle pipeline known from the prior art. The surfaces of the layers, in particular the surfaces 4.1 and 4.2 of the inner adhesive layer 4, as well as the surfaces 6.1 and 6.2 of the outer adhesive layers 6 and also the two surfaces 5.1 and 5.2 of the central barrier layer 5, are here configured smooth or unprofiled.

Figure 2:
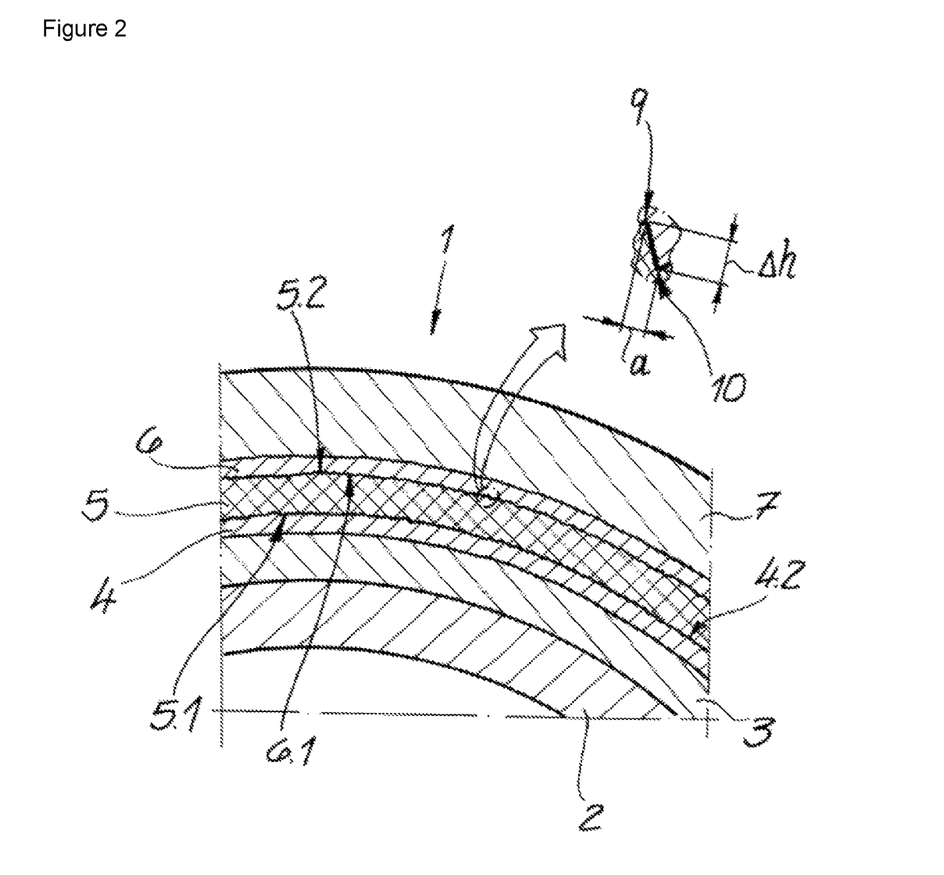
FIG. 2 shows a multilayered or six-layer pipeline equipped with the profiling according to the present disclosure.
Figure 3:
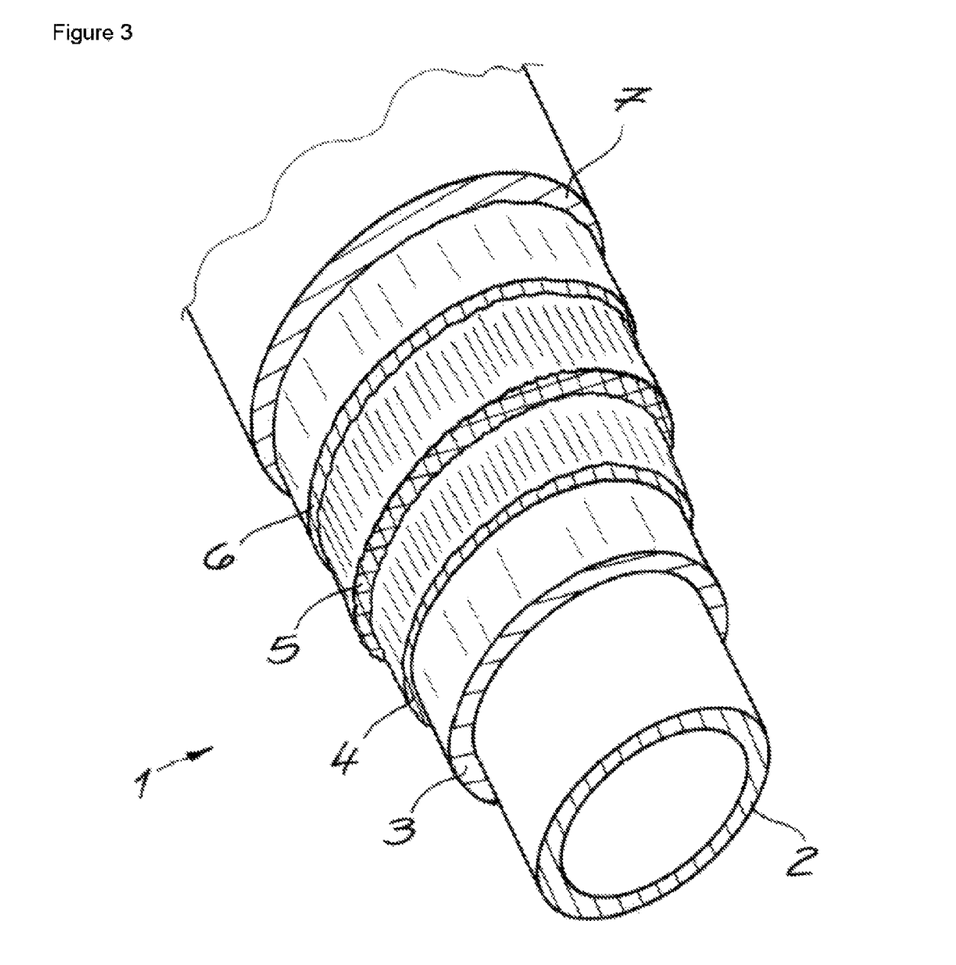
FIG. 3 shows the object according to FIG. 2 in perspective view.

FIGS. 2 and 3 show instead a pipeline according to the present disclosure. The outside surface 4.2 of the inner adhesive layer 4, as well as the inside surface 6.1 of the outer adhesive layer 6, are configured profiled according to the present disclosure. The profiling shows maxima 9 and minima 10, wherein the height difference $\Delta h$ between the maxima 9 and the minima 0 directly adjacent to the maxima 9 is between 1 and 20 µm, preferably between 5 and 15 µm. In the exemplary embodiment, the height difference $\Delta h$ may be about 10 µm. The height difference $\Delta h$ between the maxima 9 and the minima 10 is suitably dimensioned as the radial distance of the maxima and minima in the exemplary embodiment. This is represented in the enlarged cutout of FIG. 2. The inside surface 5.1 of the barrier layer 5 that faces toward the outside surface 4.2 of the inner adhesive layer 4 is advantageously configured profiled according to the present disclosure. The outside surface 5.1 of the barrier layer 5 facing toward the inside surface 6.1 of the outer adhesive layer 6 is also configured similarly profiled according to the present disclosure. The profiling of the surfaces 5.1 and 5.2 of the barrier layer 5 is preferably configured complementary to the profiling of the respectively allocated surfaces 4.2 and 6.1 of the adhesive layers 4, 6 in the exemplary embodiment. It is recommended that the maxima 9 of the outside surface 4.2 of the inner adhesive layer 4 engage in form-fitting manner, and preferably also in force-fitting manner, and vice versa, in the minima 10 of the inside surface 5.1 of the barrier layer 5. The maxima 9 of the inside surface 6.1 of the outer adhesive layer 6 suitably engages in form-fitting manner, and preferably also in force-fitting manner, and vice versa, in the minima 10 of the outside surface 5.2 of the barrier layer 5. An interlocking of the adhesive layers 4, 6 with the barrier layer 5 takes place thus at the same time via the mutually engaging profilings or maxima 9 and minima 10. The distances a between the maxima 9 and the minima 10 directly adjacent to the maxima 10 measured in circumferential direction of the pipeline 1 are preferably 1 to 20 μm and very preferably 5 to 15 μm. It can be seen especially in FIG. 2 that the profiled surfaces 4.2, 5.1, 5.2 and 6.1 are very preferably configured with undulated cross section in the exemplary embodiment. A more or less irregular wave structure is thus obtained.

The central barrier layer 5 may be made from ethylene vinyl alcohol copolymer (EVOH) in the exemplary embodiment. The adhesive layers 4, 6 attached thereto are adhesive layers 4, 6 based on polyamide. The thickness of the central barrier layer 5 is preferably 0.1 to 0.2 mm and, for example, 0.15 mm in the exemplary embodiment. The thickness of the adhesive layers is preferably 0.2 mm to 0.1 mm, preferably 0.03 mm to 0.07 mm and, for example, 0.05 mm, in the exemplary embodiment.

Figure 4:
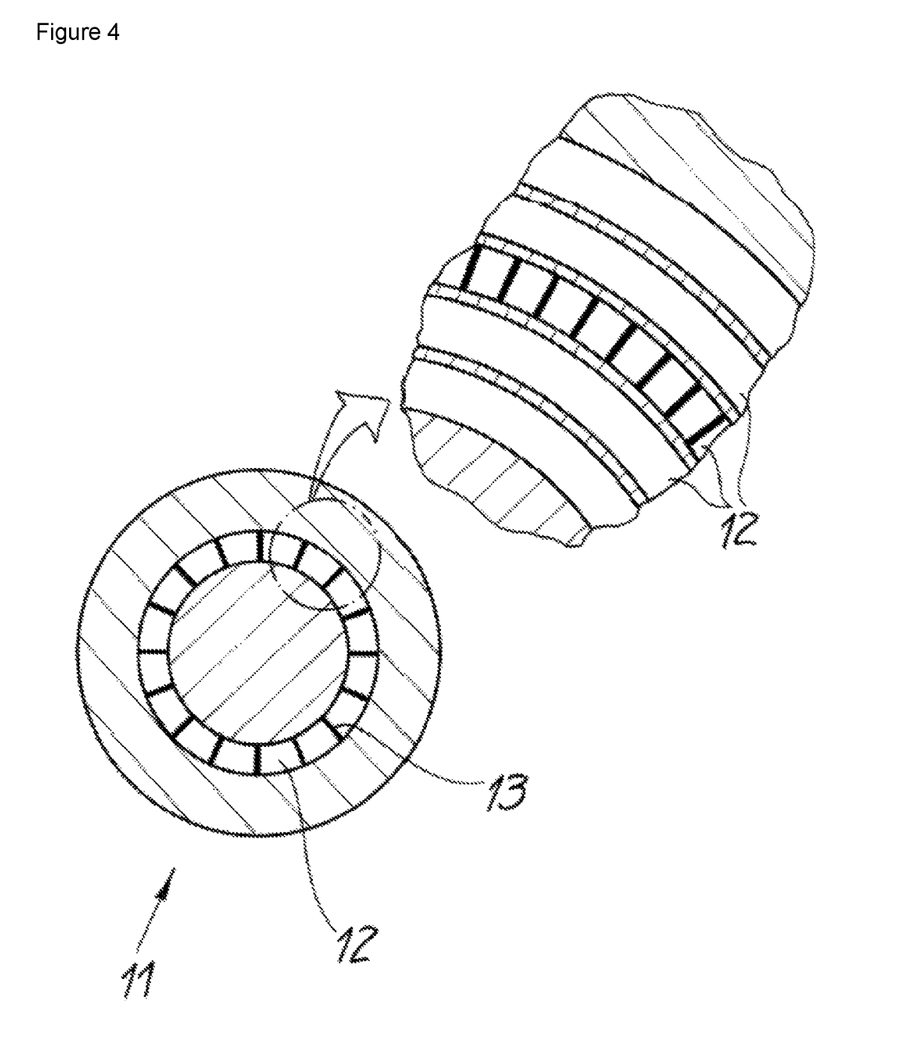
FIG. 4 shows a highly schematic representation of the cross section of an extruder for producing a pipeline according to the present disclosure.

The layers of the multilayered motor vehicle pipeline according to the present disclosure are made from thermoplastic material according to a preferred embodiment of the present disclosure. It is within the scope of the present disclosure that the multilayered motor vehicle pipeline according to the present disclosure is produced by means of coextrusion. FIG. 4 shows the cross section of an extruder 11 for such a coextrusion, wherein surfaces, profiled according to the present disclosure, of a layer can be produced with this extruder 11. For this purpose, the extruder 11 has an annular channel 12 with radial transversal webs 13. The respectively extruded layer can be provided with profiled or undulated surfaces according to the present disclosure with the aid of these radial transversal webs 13 in the annular channel 12. It is understood that the extruder 11 can have further corresponding annular channels 12 for the layers of the pipeline 1 if further profiled surfaces are to be produced. These annular channels 12 are not represented in FIG. 4. FIG. 4 insofar shows only a highly simplified cross section of a corresponding extruder 11.

The invention claimed is:

1. A multilayered fuel pipeline for motor vehicles, wherein the pipeline has at least two layers of plastic, at least one surface of at least one layer connected to another layer being profiled to define a profiled surface with a maxima and minima, characterized in that, the at least one profiled surface has an undulated cross-section, wherein a height difference Δh between the maxima and the minima directly adjacent to the maxima is between 1 and 100 μm;
wherein the distances between the maxima and the minima directly adjacent to the maxima of the profiled surface are 1 to 100 μm and the at least one profiled surface of this layer runs around over at least 80% of the circumference of the pipeline.

2. The pipeline according to claim 1, wherein the height difference Δh between the maxima and the minima directly adjacent to the maxima is between 1 and 50 μm.

3. The pipeline according to claim 1, wherein the height difference Δh between the maxima and the minima directly adjacent to the maxima is between 1 and 25 μm.

4. The motor vehicle pipeline according to claim 1, wherein the surface of another or second layer connected to a profile surface of a first layer is likewise configured profiled, this profiling of the second layer preferably likewise has maxima and minima, and the height difference Δh between the maxima and the minima directly adjacent to the minima is between 1 and 100 μm.

5. The pipeline according to claim 4, wherein the height difference Δh between the maxima and the minima directly adjacent to the maxima is between 1 and 50 μm.

6. The pipeline according to claim 4, wherein the height difference Δh between the maxima and the minima directly adjacent to the maxima is between 1 and 25 μm.

7. The motor vehicle pipeline according to claim 1, wherein the maxima of the profiled surface of the first layer engages in a form-fitting—and preferably force-fitting—manner in the minima of the profiled surface of the second layer, and vice versa.

8. The motor vehicle pipeline according to claim 1, wherein the at least one profiled layer or the at least one profiled surface of this layer runs around over at least 90% of the circumference of the pipeline.

9. The motor vehicle pipeline according to claim 1, wherein the at least one profiled layer or the at least one profiled surface of this layer runs around over at least 95% of the circumference of the pipeline.

10. The motor vehicle pipeline according to claim 1, wherein the at least one profiled layer or the at least one profiled surface of this layer runs around the entire circumference of the pipeline.

11. The motor vehicle pipeline according to claim 1, wherein the distances between the maxima and the minima directly adjacent to the maxima of the profiled surface are 1 to 50 μm.

12. The motor vehicle pipeline according to claim 1, wherein the distances between the maxima and the minima directly adjacent to the maxima of the profiled surface are 1 to 25 μm.

13. The motor vehicle pipeline according to claim 1, wherein the distances between the maxima and the minima directly adjacent to the maxima of the profiled surface are 2 to 20 μm.

14. The motor vehicle pipeline according to claim 1, wherein the at least one layer provided with at least one profiled surface is a central layer of the pipeline, which is respectively connected via its two surfaces to another layer of the pipeline.

15. The motor vehicle pipeline according to claim 1, wherein the at least one layer provided with at least one profiled surface is an adhesive layer of the pipeline, which is attached with the at least one profiled surface to a central barrier layer of the pipeline.

16. The motor vehicle pipeline according to claim 1, wherein the at least one layer provided with at least one profiled surface and the at least one layer attached to the profiled surface are produced by coextrusion.

17. The motor vehicle pipeline according to claim 1, wherein the profiling of the at least one profiled surface is configured in the form of webs and grooves, wherein the webs and grooves extend in a longitudinal direction of the pipeline.

18. The motor vehicle pipeline according to claim 1, wherein the height difference Δh between the maxima and the minima directly adjacent to the maxima is 2 to 15 μm.

19. The motor vehicle pipeline according to claim 1, wherein at least two adhesive layers, are provided and at least one surface of each adhesive layer has a profiled configuration.

20. The motor vehicle pipeline according to claim 19, wherein at least one barrier layer is interposed between the at least two adhesive layers, and wherein the at least two adhesive layers with their profiled surfaces are attached directly to the at least one barrier layer.

21. The motor vehicle pipeline according to claim 20, wherein the at least one barrier layer has a profiled surface corresponding to the profiled surfaces of the at least two adhesive layers.

\* \* \* \* \*